United States Patent

Hoover et al.

Patent Number: 6,060,166
Date of Patent: May 9, 2000

[54] FLEXIBLE GRAPHITE FIBER THERMAL SHUNT

[75] Inventors: Ronald E. Hoover, Manhattan Beach; Robert S. Hutchins, Long Beach; Stuart J. Marble, Westchester; Clark A. Saito, Cerritos; Manuel B. Valle, Covina, all of Calif.

[73] Assignee: Raytheon Company, Lexington, Mass.

[21] Appl. No.: 09/020,600

[22] Filed: Feb. 5, 1998

[51] Int. Cl.⁷ ........................................ B32B 9/00

[52] U.S. Cl. .......................... 428/408; 428/112; 428/378; 428/448; 428/593; 361/696; 361/704; 165/82; 165/83; 29/419.1

[58] Field of Search ....................... 428/408, 448, 428/112, 378, 593; 165/164, 185, 82, 83, 104.33; 361/696, 704; 29/419.1

[56] References Cited

U.S. PATENT DOCUMENTS

| | | | |
|---|---|---|---|
| 2,520,756 | 8/1950 | Bryant | 181/57 |
| 4,306,169 | 12/1981 | Diepers | 310/248 |
| 4,443,726 | 4/1984 | Ikegami | 310/248 |
| 4,576,082 | 3/1986 | Scuro | 89/8 |
| 4,587,723 | 5/1986 | Scuro | 29/597 |
| 4,849,858 | 7/1989 | Grapes et al. | 361/388 |
| 5,542,471 | 8/1996 | Dickinson | 165/170 |
| 5,766,691 | 6/1998 | Arnold et al. | 427/450 |
| 5,769,158 | 6/1998 | Yao | 165/185 |
| 5,806,588 | 9/1998 | Weeks, Jr. et al. | 165/181 |
| 5,825,624 | 10/1998 | Arnold et al. | 361/708 |
| 5,834,337 | 11/1998 | Unger et al. | 438/122 |
| 5,849,130 | 12/1998 | Browne | 156/256 |

*Primary Examiner*—Deborah Jones
*Assistant Examiner*—Abraham Bahta
*Attorney, Agent, or Firm*—Colin M. Raufer; Leonard A. Alkov; Glenn H. Lenzen, Jr.

[57] ABSTRACT

A thermal shunt comprising flexible graphite fibers for removing heat from components coupled thereto and providing mechanical isolation. The thermal shunt comprises a plurality of stacked layers of graphite fibers secured together at opposite ends to form rigid sections at the respective opposite ends that provide for thermal coupling. Portions of the graphite fibers between the rigid sections are flexible and provide mechanical isolation between components to which the thermal shunt is coupled.

9 Claims, 1 Drawing Sheet

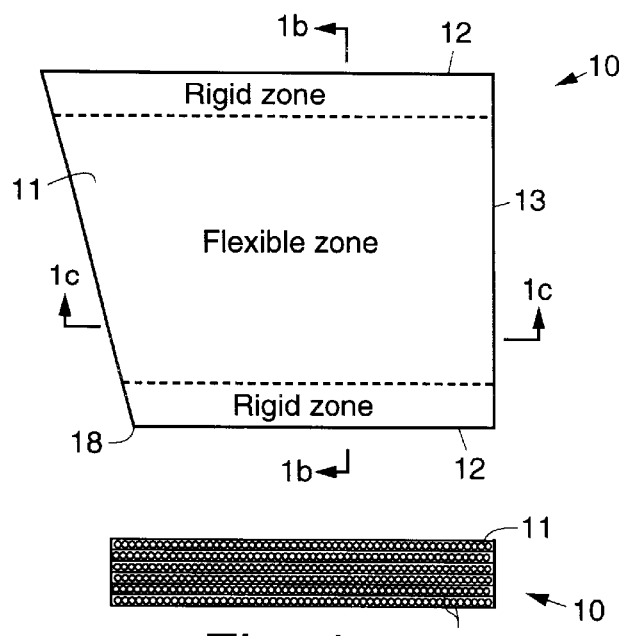
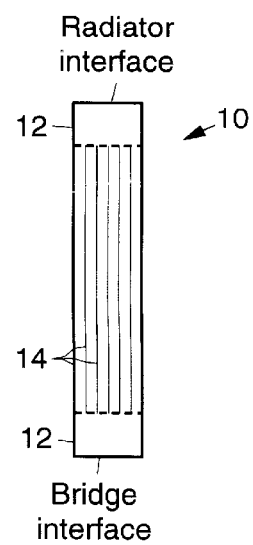
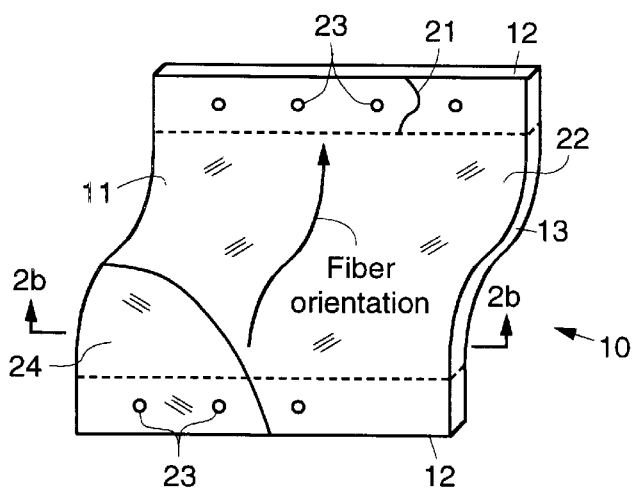
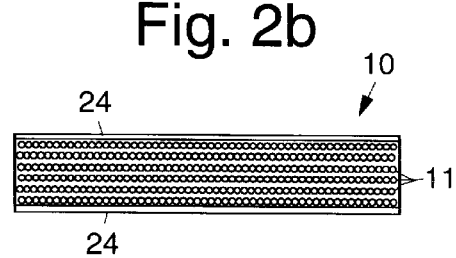

FLEXIBLE GRAPHITE FIBER THERMAL SHUNT

This invention was made with Government support under Contract No. F04701-92-C-0062 awarded by the Department of the Air Force. The Government has certain rights in this invention.

BACKGROUND

The present invention relates generally to flexible thermal shunts for removing heat from components, and more particularly, to a flexible thermal shunt comprising flexible graphite fibers for removing heat from spacecraft components.

Although many materials and structures are available for thermal management, achieving mechanical isolation between thermally coupled components has been possible only through the use of heavy structures, such as flexible metal bellows, for example. The size and weight of such structures has severely limited design options and the present invention removes the limitations placed on such conventional thermal management approaches.

In particular, heretofore, there has been no good way to remove heat from spacecraft components without subjecting them to a mechanical load. In the past, thermal management on spacecraft has required the use of heat pipes or copper shunts which are both heavy and rigid or heavy and very intricately made to provide limited flexibility. In certain applications, such loads can create serious problems, including distorting or misaligning sensitive optical components. The present invention provides a means for overcoming these limitations.

Accordingly, it is an objective of the present invention to provide for a flexible thermal shunt that eliminates the above-mentioned problems. It is a further objective of the present invention to provide for a flexible thermal shunt comprising flexible graphite fibers for removing heat from components.

SUMMARY OF THE INVENTION

To accomplish the above and other objectives, the present invention provides for a flexible thermal shunt comprising flexible graphite fibers for removing heat from components, such as spacecraft components, and the like. In general, the thermal shunt comprises a plurality of stacked layers of graphite fibers secured together at opposite ends to form rigid sections at the respective opposite ends and portions of the graphite fibers between the rigid sections are flexible.

The rigid sections at the respective opposite ends of the stacked layers of graphite fibers provide for thermal coupling. The portions of the graphite fibers disposed between the rigid sections are flexible and provide mechanical isolation between components to which the thermal shunt is coupled.

The flexible thermal shunt eliminates the problems mentioned in the Background section. The shunt comprises partially bonded layers of oriented graphite-fibers. Heat transfer into and out of the shunt occurs by way of rigid (bonded) sections at each end of the shunt, while the intervening (unbonded) fibers are free to flex.

As mentioned above, conventional thermal management approaches used on spacecraft required the use of heat pipes or copper shunts which are both heavy and rigid or heavy and very intricately made to provide limited flexibility. However, the present invention allows construction of efficient thermal shunts that are both lightweight and flexible which has not been achieved in the prior art.

The present invention is well-suited for use with any product which requires mechanical isolation between thermally coupled components. There is no conventional widely applicable method that currently exists for achieving this isolation.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1a illustrates a top view of an exemplary prototype flexible thermal shunt in accordance with the principles of the present invention;

FIGS. 1b and 1c illustrate cross-sectional side views of the prototype flexible thermal shunt of FIG. 1a taken along the lines 1b—1b and 1c—1c, respectively;

FIG. 2a illustrates a top view of a preferred flexible thermal shunt in accordance with the principles of the present invention; and FIG. 2b shows a cross-sectional side view of the shunt 10 shown in FIG. 2a.

DETAILED DESCRIPTION

Referring to the sole drawing figures, FIGS. 1a and 1b illustrate top and cross-sectional side views of an exemplary prototype flexible thermal shunt 10 in accordance with the principles of the present invention. The flexible thermal shunt 10 is designed to remove heat from an electro-optical assembly or other component to a heat sink or radiator, for example, while preserving mechanical isolation.

The comparison given in Table 1, which illustrates the thermal conductivity and density of copper and graphite, shows that a heat transfer device constructed using oriented graphite fibers 11 may be more efficient and far lighter than one constructed using copper. However, graphite fiber composites (such as those shown in Table 1) are also very stiff and offer no advantage over metals in terms of mechanical isolation. To achieve the required flexibility, a novel type of composite structure has been developed in which graphite fibers 11 have only their end sections secured (bonded) together. An example of the structure is shown in the drawing figure.

TABLE 1

| | $\kappa$, Thermal conductivity at 298° K., watts/m Kelvin | $\rho$, Density, grams/m$^3$ at 298° K. |
|---|---|---|
| Copper | 401 | 8920 |
| Pyrolytic graphite | 1960 $\parallel$ 5.73 $\perp$ | 2267 |
| Graphite composite | approx. 570 | approx. 1750 |

In Table 1, the $\parallel$ and $\perp$ symbols indicate crystallographic directions parallel to and perpendicular to the graphite planes, respectively. The graphite composite material is a commercial laminate with a 55% volume fraction of unidirectional K1100 graphite fibers The exemplary flexible thermal shunt 10 shown in the drawing figure is designed to transfer heat from an electro-optical assembly to a radiator on an outer surface of a spacecraft. Good thermal coupling at each end is provided by rigid (bonded) sections 12 or zones 12 of the shunt 10, while mechanical isolation is provided by an intervening flexible (unbonded) section 13 or zone 13.

In developing the flexible thermal shunt 10, it was constructed using layers of 5-mil (0.005") thick, resin-impregnated K 1100 unidirectional graphite fibers 11 interleaved with sheets 14 of 0.75-mil thick Teflon. The process steps were as follows.

Approximately 100 layers 14 of graphite fibers 11 were cut slightly oversize in a trapezoidal shape as shown in the FIG. 1. In half of the layers, the fiber axis was vertical (0°) and in the other half it was parallel to the angled side (27.5°). The layers 14 were stacked in two groups of three layers 14. Group "A" had three layers 14 with 0°/27.5°/0° orientations, while Group "B" had three layers 14 with 27.5°/0°/27.5° orientations. Thirty-three Teflon sheets 14 were cut to the size and shape of the "flexible zone" 13 shown in the drawing figure. The layers 14 were assembled in the sequence: "A", Teflon, "B", Teflon and so forth, until the thickness at the rigid ends 12 or sections 12 comprising rigid zones 12 reached about 0.500". The "flexible zone" 13 was about 0.025" thicker than the rigid zones 12 because of the Teflon sheets 14. The entire assembly was cured. The two end layers 14 became rigid, while the central region fused into thirty-three three-ply layers 14.

The intention was to create the flexible zone 13 by removing the Teflon sheets. However, with this first prototype shunt 10, the Teflon sheets 14 could not be removed and the structure was fully rigid. Although not meeting the design objective, this structure did prove useful for thermal conductivity measurements.

Several alternative assembly methods were then investigated and from those, the following approach was fabricated. A long mat of K1100 graphite fibers 11 (oriented lengthwise) was fabricated and it was impregnated at regular intervals with stripes of resin perpendicular to its length. One-hundred slightly oversized trapezoidal pieces 18 were cut out of the mat of graphite fibers 11 and opposite ends were bonded with a stripe of resin. All trapezoidal pieces 18 were stacked together and the ends were clamped. The resin was cured to form the rigid ends 12 or sections 12, and the rigid ends 12 were machined to final dimensions. Number 4–40 thread inserts (not shown in FIGS. 1a and 1) were installed at both ends 12 of the shunt 10 to mate with bridge (electro-optical assembly) and radiator interfaces.

Additional development testing has resulted in a flexible thermal shunt 10 that is robust and flexible and has the desired thermal conductivity. A top view of this preferred flexible thermal shunt 10 is shown in FIG. 2a. FIG. 2b shows a cross-sectional side view of the shunt 10 shown in FIG. 2a. The preferred shunt 10 employs five mil thick resin-impregnated K1100 unidirectional graphite fibers 11 that are not continuously impregnated. The unidirectional graphite fibers 11 are impregnated at regular intervals along their length with stripes of resin perpendicular to their length. The process steps used to form the shunt 10 are as follows.

A long mat of K1100 graphite fibers (oriented lengthwise) was fabricated and impregnated at regular intervals with stripes of resin perpendicular to its length. Ten slightly oversized rectangular pieces were cut out of the mat such that each end was bonded with a stripe of resin. The slightly oversized rectangular pieces were stacked together and resin impregnated graphite fabric 21 was overlaid on the resin impregnated ends of the rectangular pieces. A plurality of stacks, with all fiber parallel, were built up to provide a desired thickness of the shunt 10. The plurality of stacks were debulked under vacuum to achieve initial compression.

The plurality of stacks were combined (pressed together) in a tool and a final outer fabric layer 22 was placed on the outside of the stack. The resin was cured under heat and pressure and the cured rigid ends of the stack were machined to final dimensions. Threaded inserts 23 were installed at both ends of the cured stack to mate with bridge and radiator interfaces (not shown). The final, machined shunt 10 was then enclosed in a ventable, protective flexible plastic film enclosure 24 to protect and contain the uncoated fibers 11. This assembly is highly heat conductive and has acceptable flexibility in all directions.

Thus, a flexible thermal shunt comprising flexible graphite fibers for removing heat from components has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A thermal shunt for transferring heat between components coupled thereto, said shunt comprising:

a plurality of stacked layers of graphite fibers, wherein the graphite fibers in a selected layer are oriented at a predetermined angle relative to the graphite fibers in an adjacent layer, and wherein the graphite fibers in all stacked layers are secured together to form rigid sections at opposite ends of the shunt, and wherein the graphite fibers in all stacked layers between the rigid sections are free to flex, and wherein heat transfer into and out of the shunt occurs by way of the rigid sections at each end of the shunt, while the intervening fibers provide mechanical isolation.

2. The thermal shunt of claim 1 wherein the rigid sections are bonded.

3. The thermal shunt of claim 1 wherein the graphite fibers comprise K1100 graphite fibers.

4. A thermal shunt for transferring heat comprising:

a plurality of stacked layers of graphite fibers secured together at opposite ends to form rigid sections at the respective opposite ends that provide for thermal coupling and wherein portions of the graphite fibers between the rigid sections are flexible and provide mechanical isolation.

5. The thermal shunt of claim 4 wherein the rigid sections are bonded.

6. The thermal shunt of claim 4 wherein the graphite fibers comprise K1100 graphite fibers.

7. The thermal shunt of claim 4 further comprising:

resin impregnated graphite fabric overlaid on the ends comprising the rigid sections;

an outer fabric layer disposed around the stacked layers; and a protective flexible plastic film enclosure disposed around the stacked layers to protect the graphite fibers.

8. The thermal shunt of claim 6 further comprising threaded inserts disposed in the rigid sections to allow tight mechanical seating of the thermal shunt to an electro-optical assembly and to a radiator/heat sink to ensure improved heat removal and thermal transfer.

9. The thermal shunt of claim 6 wherein the rigid sections further comprise a flexible middle section to allow adjustment of an enclosed thermal path.

* * * * *